United States Patent
Martin et al.

(10) Patent No.: US 11,194,330 B1
(45) Date of Patent: Dec. 7, 2021

(54) SYSTEM AND METHOD FOR AUDIO CLASSIFICATION BASED ON UNSUPERVISED ATTRIBUTE LEARNING

(71) Applicant: HRL Laboratories, LLC, Malibu, CA (US)

(72) Inventors: Charles E. Martin, Santa Monica, CA (US); Soheil Kolouri, Calabasas, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 252 days.

(21) Appl. No.: 16/118,161

(22) Filed: Aug. 30, 2018

Related U.S. Application Data

(60) Provisional application No. 62/581,625, filed on Nov. 3, 2017.

(51) Int. Cl.
| | |
|---|---|
| *G05D 1/00* | (2006.01) |
| *G10L 25/51* | (2013.01) |
| *G10L 25/18* | (2013.01) |
| *G10L 25/30* | (2013.01) |

(52) U.S. Cl.
CPC ............ *G05D 1/0088* (2013.01); *G10L 25/18* (2013.01); *G10L 25/30* (2013.01); *G10L 25/51* (2013.01); *G05D 2201/0212* (2013.01)

(58) Field of Classification Search
CPC .......... G05D 1/0088; G05D 2201/0212; G10L 25/18; G10L 25/30; G10L 25/51
See application file for complete search history.

(56) References Cited

U.S. PATENT DOCUMENTS

| | | | |
|---|---|---|---|
| 9,090,259 B2 | 7/2015 | Dolgov et al. | |
| 9,229,453 B1 | 1/2016 | Lee | |
| 10,957,337 B2* | 3/2021 | Chen | G10L 15/16 |
| 2009/0287624 A1* | 11/2009 | Rouat | G06K 9/4623 |
| | | | 706/20 |
| 2015/0032449 A1* | 1/2015 | Sainath | G10L 15/16 |
| | | | 704/235 |
| 2016/0207528 A1* | 7/2016 | Stefan | B60W 10/04 |
| 2016/0335553 A1* | 11/2016 | Battaglino | G10L 21/06 |
| 2016/0350610 A1* | 12/2016 | Yoo | G06K 9/6272 |

(Continued)

OTHER PUBLICATIONS

Notification of Transmittal of International Search Report and the Written Opinion of the International Searching Authority for PCT/US2018/024411; dated Jul. 16, 2018.

(Continued)

*Primary Examiner* — Frederick M Brushaber
*Assistant Examiner* — Elizabeth Yang
(74) *Attorney, Agent, or Firm* — Tope-McKay & Associates

(57) ABSTRACT

Described is an audio classification system for classifying audio signals. In operation, the system extracts salient patches from an intensity spectrogram of an audio signal. Thereafter, multi-scale global average pooling (GAP) features are extracted for all salient patches. The GAP features are clustered, with each cluster becoming a key attribute. A test audio signal can then be mapped onto a histogram of key attributes. Based on the histogram, the test audio signal can then be classified as a sound class, allowing for operation of a device based on the classification of the sound class.

15 Claims, 8 Drawing Sheets

(56) References Cited

U.S. PATENT DOCUMENTS

| | | | |
|---|---|---|---|
| 2017/0132510 A1* | 5/2017 | Paluri | H04L 67/10 |
| 2017/0140260 A1* | 5/2017 | Manning | G10L 25/30 |
| 2017/0249957 A1* | 8/2017 | Park | G10L 25/51 |
| 2018/0018553 A1* | 1/2018 | Bach | G06K 9/4628 |
| 2018/0285699 A1 | 10/2018 | Kolouri et al. | |
| 2019/0042888 A1* | 2/2019 | Tsutsui | G06T 7/11 |
| 2019/0304438 A1* | 10/2019 | Qian | G10L 17/04 |

OTHER PUBLICATIONS

International Search Report of the International Searching Authority for PCT/US2018/024411; dated Jul. 16, 2018.

Written Opinion of the International Searching Authority for PCT/US2018/024411; dated Jul. 16, 2018.

Yao Lu, "Unsupervised Learning for Image Classification", University of Helsinki Department of Computer Science, Dec. 8, 2015, see pp. 3, 6-7, 13, 43; and figures 2, 7, 12.

Guanbin Li et al., "Visual Saliency Detection Based on Multiscale Deep CNN Features", IEEE Transactions on Image Processing, Sep. 7, 2016, see pp. 1-2.

Junyuan Xie, et al., "Unsupevised Deep Embedding for Clustering Analysis", ICML'16 Proceedings of the 33rd International Conference on International Conference on Machine Learning, vol. 48, pp. 478-487, Jun. 24, 2016.

Songfan Yang, et al., "Multi-scale recognition with DAG-CNNs", 2015 IEEE International Conference on Computer Vision (ICCV), May 20, 2015, see pp. 1215-1223.

Sotiras, Aristeidis, Susan M. Resnick, and Christos Davatzikos. "Finding imaging patterns of structural covariance via non-negative matrix factorization." NeuroImage 108: pp. 1-16, 2015.

Simonyan, Karen, and Andrew Zisserman. "Very deep convolutional networks for large-scale image recognition." arXiv preprint arXiv: 1409.1556, 2014, pp. 1-14.

Lindeberg, Tony. Scale-space theory in computer vision. vol. 256. Springer Science & Business Media, 2013, Chapter 7, pp. 165-170.

Xie, Junyuan, Ross Girshick, and Ali Farhadi. "UnsuperviseddDeep embedding for clustering analysis." arXiv preprint arXiv: 1511.06335, 2015, pp. 1-10.

Zhou, B., Khosla, A., Lapedriza, A., Oliva, A., & Torralba, A. "Object detectors emerge in deep scene CNNs." arXiv preprint arXiv:1412.6856, 2014, pp. 1-12.

Gonzalez-Garcia, A., Modolo, D., & Ferrari, V. "Do semantic parts emerge in convolutional neural networks?" arXiv preprint arXiv: 1607.03738, 2016, pp. 1-18.

Kolouri, S., Rohde, G. K., & Hoffman, H. "Sliced wasserstein distance for learning gaussian mixture models." arXiv preprint arXiv:1711.05376, 2017, pp. 1-13.

Kolouri, S., Martin, C. E., & Hoffmann, H. "Explaining Distributed Neural Activations via Unsupervised Learning." In Proceedings of the IEEE Conference on Computer Vision and Pattern Recognition Workshops, pp. 20-28, 2017.

J. Salamon, C. Jacoby and J. P. Bello, "A Dataset and Taxonomy for Urban Sound Research", 22nd ACM International Conference on Multimedia, Orlando USA, Nov. 2014, pp. 1-4.

Sotiras, Aristeidis, Susan M. Resnick, and Christos Davatzikos. "Finding imaging patterns of structural covariance via non-negative matrix factorization." NeuroImage 108 (2015): pp. 1-16.

Simonyan, Karen, and Andrew Zisserman. "Very deep convolutional networks for large-scale image recognition." arXiv preprint arXiv:1409.1556, pp. 1-14, (2014).

T. Lindeberg, "Scale-space theory in computer vision", vol. 256. Springer Science & Business Media, 2013. Chapter 7. pp. 165-170.

Xie, Junyuan, Ross Girshick, and Ali Farhadi. "Unsupervised Deep Embedding for Clustering Analysis." arXiv preprint arXiv:1511.06335, pp. 1-10, (2015).

B. Zhou, A. Khosla, A. Lapedriza, A. Oliva, and A. Torralba. "Object detectors emerge in deep scene CNNs." arXiv preprint arXiv:1412.6856, pp. 1-12, 2014.

A. Gonzalez-Garcia, D. Modolo, and V. Ferrari. "Do semantic parts emerge in convolutional neural networks?", arXiv preprint arXiv:1607.03738, pp. 1-18, 2016.

Soheil Kolouri, Charles E Martin, and Heiko Hoffmann. "Explaining Distributed Neural Activations via Unsupervised Learning" by Conference on Computer Vision and Pattern Recognition, Explainable Computer Vision Workshop, pp. 1670-1678, 2017.

* cited by examiner

SYSTEM AND METHOD FOR AUDIO CLASSIFICATION BASED ON UNSUPERVISED ATTRIBUTE LEARNING

CROSS-REFERENCE TO RELATED APPLICATIONS

This application claims the benefit of and is a non-provisional patent application of U.S. 62/581,625, filed on Nov. 3, 2017, the entirety of which is hereby incorporated by reference.

BACKGROUND OF INVENTION

(1) Field of Invention

The present invention relates to an audio classification system and, more specifically, to a system for classifying audio signals based on unsupervised attributed learning.

(2) Description of Related Art

Audio classifiers are designed to classify an input audio signal. Such systems are often implemented in speech recognition systems where the system classifies the audio signal as a particular word. However, in autonomous vehicular systems, a need exists to classify random audio signals as particular objects, object interactions, or potential obstacles, not just particular words. Due to the randomness of the presented audio signal, current audio classifiers are easily fooled by noise and mixing of different sounds. Further, the false alarms generated by existing audio classifiers are not explainable.

In a somewhat related art, machine vision methods have been implemented to probe each unit of a convolutional neural network (CNN) to obtain image regions with highest activations per unit (see Zhou et al. and Gonzalez-Garcia et al. in the List of Incorporated Literature References, Literature Reference Nos. 6 and 7). Machine vision methods are related because audio signals can be converted into spectrograms, which are essentially images. The above methods, however, suffer from several major disadvantages. For example, these methods require a human in the feedback loop to identify a common theme or concept that exists between top scoring regions. Further, existing methods focus on analyzing neurons with the highest activations and neglect the neural activation patterns over the entire network for object classification.

Thus, a continuing need exists for a robust and fool proof audio classification system that implements an attribute-oriented sound classifier and that is operable in domains such as autonomous driving and rotorcraft operation.

SUMMARY OF INVENTION

This disclosure provides an audio classification system for classifying audio signals. In various embodiments, the system includes one or more processors and a memory, the memory being a non-transitory computer-readable medium having executable instructions encoded thereon, such that upon execution of the instructions, the one or more processors perform several operations. In operation, the system extracts salient patches from an intensity spectrogram of an audio signal. Thereafter, neural-network feature vectors are extracted for all salient patches. The feature vectors are then clustered, with each cluster becoming a key attribute. The process of extracting salient patches and extracting the feature vectors for the salient patches can be repeated for many audio signals in the training data; whereas the clustering is performed on the features for the whole training data set. A test audio signal can then be mapped onto a histogram of key attributes. Based on the histogram, the test audio signal can then be classified as a sound class, allowing for operation of a device based on the classification of the sound class.

In another aspect, the salient patches are extracted based on a neural network's activation for each spectrogram pixel or group of pixels.

In yet another aspect, the neural-network feature vectors are multi-scale global average pooling (GAP) features that are multi-scale feature vectors computed based on activations of at least two layers in a neural network.

Additionally, classifying the test audio signal includes input feature vectors from the neural network in response to an intensity spectrogram to be classified.

In yet another aspect, the device is an autonomous vehicle, such that autonomous vehicle performs a physical maneuver operation based on the classification of the sound class.

Additionally, in clustering the GAP features, the GAP features are clustered using iterative unsupervised learning.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
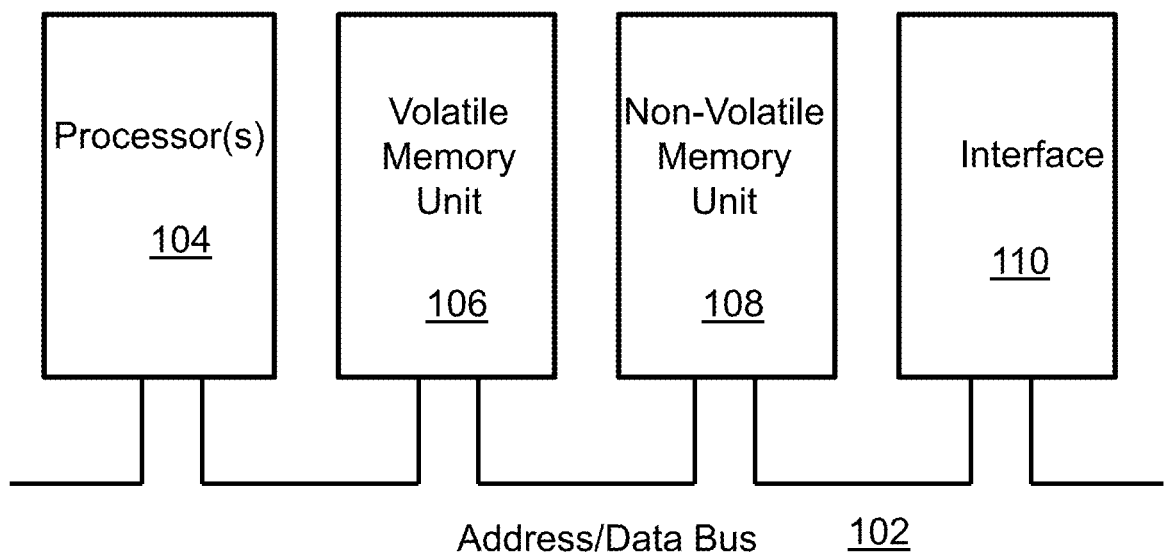
FIG. 1 is a block diagram depicting the components of a system according to various embodiments of the present invention.

The present invention relates to an audio classification system and, more specifically, to a system for classifying audio signals based on unsupervised attributed learning. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Sotiras, Aristeidis, Susan M. Resnick, and Christos Davatzikos. "Finding imaging patterns of structural covariance via non-negative matrix factorization." NeuroImage 108 (2015): pages 1-16.
2. Simonyan, Karen, and Andrew Zisserman. "Very deep convolutional networks for large-scale image recognition." arXiv preprint arXiv: 1409.1556(2014),
3. T. Lindeberg, "Scale-space theory in computer vision", volume 256. Springer Science & Business Media, 2013. Chapter 7. pages 165-170.
4. [UrbanSound8K], found at https://serv.cusp.nyu.edu/projects/urbansounddataset/urbansound8k.html
5. Xie, Junyuan, Ross Girshick, and Ali Farhadi. "Unsupervised Deep Embedding for Clustering Analysis." arXiv preprint arXiv:1511.06335 (2015).
6. B. Zhou, A. Khosla, A. Lapedriza, A. Oliva, and A. Torralba. "Object detectors emerge in deep scene CNNs." arXiv preprint arXiv:1412.6856, 2014.
7. A. Gonzalez-Garcia, D. Modolo, and V. Ferrari. "Do semantic parts emerge in convolutional neural networks?", arXiv preprint arXiv:1607.03738, 2016.

(2) Principal Aspects

Various embodiments of the invention include three "principal" aspects. The first is a system for audio classification. The system is typically in the form of a computer system operating software or in the form of a "hard-coded" instruction set. This system may be incorporated into a wide variety of devices that provide different functionalities. As a non-limiting example, the system can be implemented within an autonomous vehicle, such as a drone or automobile, etc. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
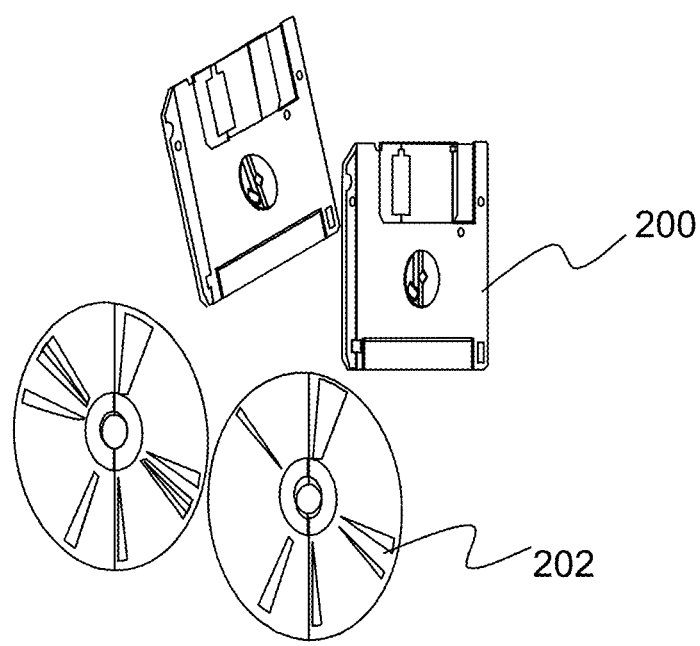
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and method to improve the recognition performance of a deep-learning network by learning salient sound attributes in an unsupervised manner and using this information in parallel to the deep network for improved classification of audio data. For example, if one of the classes of sounds is "children playing", this class may be correlated with the sound attribute "bird song"; thus, learning how to recognize birdsong can help to identify children playing even though birdsong was not explicitly labelled in a training data set. The system operates through a four-phase process, which allows for reliable classification of audio signals based on their attributes. In the first phase, the salient attributes of the input are extracted based on the activation patterns of a deep convolutional neural network (CNN). In the second phase, the salient attributes are fed through the CNN to extract the hierarchical responses of the network to individual salient attributes. In the third phase, an iterative unsupervised learning approach is applied to the network response to identify the key attributes learned by the network. Finally, the input audio signal is summarized by a feature indicating the occurrence frequency of the key attributes. The feature summarization allows for classification and corresponding actions by a device in which the system is implemented (e.g., such as maneuvering a vehicle based on the audio classification).

Specifically, the system transforms audio signals in the time-domain to their corresponding image-based representations as spectrograms. A CNN is trained to classify the audio data based on the spectrogram representation of the data. The system starts with the trained CNN and learns sound attributes that are encoded in distributed activation patterns of the network. The prior art methods often utilize corresponding image/spectrogram regions with highest activations of each unit of a CNN to find salient attributes. In contrast to such methods, the system of this disclosure models the pattern of activations in a group of CNN units as opposed to single units to find salient attributes. In addition, the system of the present disclosure combines the information extracted from key attributes with that of a conventional deep CNN to provide a significant boost in audio classification performance compared to the prior art. Further details are provided below.

(4) Specific Details of Various Embodiments

As noted above, the present disclosure provides an audio classification system. A key purpose of the system is to recognize salient attributes in spectrograms derived from audio signals. The audio signals may be recorded by one or more microphones and are converted from the time-domain to the frequency domain using the Short-Time Fourier Transform (STFT). The spectrograms may be single-channel, in which case they carry only magnitude information, or multi-channel, in which case they carry additional information such as phase. These one or multi-channeled spectrograms are then processed to generate probabilities for a given set of sound categories, as described in the following. The category with the highest probability may identify the most prominent sound in the recording.

Figure 3:
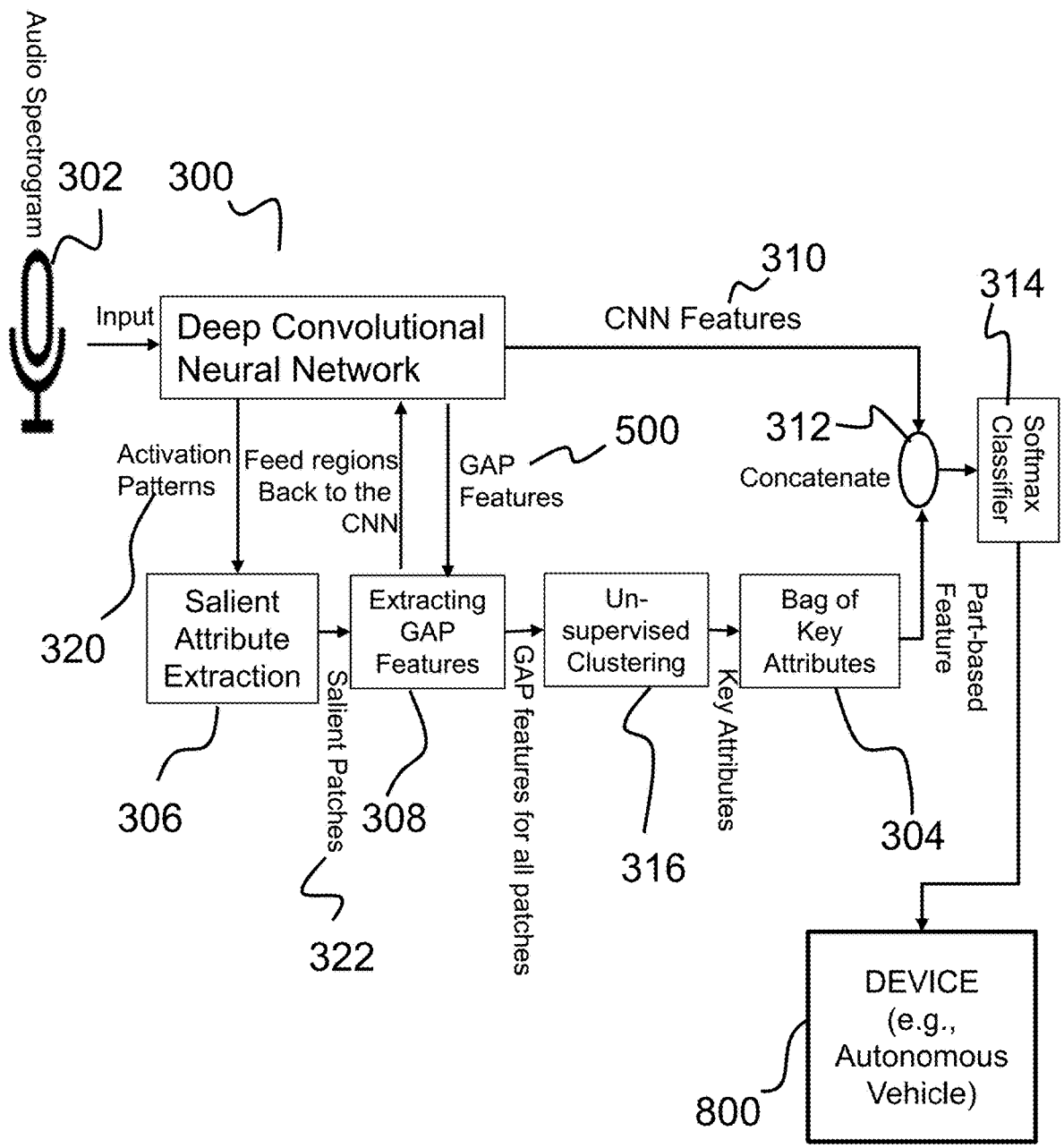
FIG. 3 is a flow chart illustrating process flow of a system according to various embodiments of the present invention.

The system of this disclosure uses a convolutional neural network (CNN) to generate the related probabilities. See Literature Reference No. 2 in the List of Incorporated Literature References for a description of a CNN. The present invention improves upon traditional CNNs by using an unsupervised scheme for identifying the learned key attributes of a sound event. As shown in FIG. 3, the system includes a deep CNN 300 and receives an audio spectrogram 302 as input into the deep CNN 300. The key attributes are learned by first identifying the regions of the input spectrogram that are deemed salient by the network and then analyzing the network's activation patterns in these salient regions. As a result, a histogram of key attributes (Bag of Key Attributes 304) is obtained. These key attributes 304 are then used to improve the accuracy of category probabilities, which in turn could be used for decision making. The deep CNN 300 is used in three different ways: first, to filter the input data 302 to obtain salient audio segments through Salient Attribute Extraction 306 (see Phase 1 below). Second, to convert salient input patches into feature vectors through an Extracting GAP Features 308 process (see Phase 2 below) (i.e., each patch has GAP features 500, and for all patches, there are list of GAP features 500), which allows for Unsupervised Clustering 316 to generate the key attributes. Third, the output 310 of the CNN 300 is concatenated 312 with the Bag of Key Attributes 304 and mapped onto the classification probabilities using a classifier 314 (e.g., Softmax Classifier). A device 800 can then be caused to operate based on the classification. Thus, described below are Salient Attribute Extraction 306, GAP-Features Extraction 308, Unsupervised Clustering 316 of salient attributes, and Bag of Key-Attributes 304 extraction.

(4.1) Salient Attribute Extraction

The system starts by identifying salient regions of an input spectrogram 302. Given a pre-trained CNN 300 and an input spectrogram 302, elastic Nonnegative Matrix Factorization (NMF) is applied to the activation patterns (i.e., last convolutional layer) of the CNN 300 to obtain and extract principal activation patterns 320 for the input data 302 (see Literature Reference No. 1 for a description of NMF). Note that since the fully connected layers of the CNN 300 are not used at this stage, the size of the input spectrogram could vary.

More precisely, let $X=[x_k]_{k=1}^m \in \mathbb{R}^{d \times m}$ denote the vectorized CNN 300 responses of the last convolutional layer (e.g. the 'conv5_4' of VGG19) where m is the number of convolutional kernels at the last layer (e.g. m=512 in VGG19), and d is the number of nodes per convolutional kernel and scales with the size of the input spectrogram (see Literature Reference No. 2 for further details regarding vectorized CNN responses). Thereafter, the NMF is formulated as, $$\text{argmin}_{W,H} \frac{1}{2}\|X - HW\|_F^2 + \gamma\lambda(\|W\|_1 + \|H\|_1) + \frac{1}{2}\gamma(1-\lambda)(\|W\|_F^2 + \|H\|_F^2)$$

where $\|\cdot\|_F$ is the Frobenius norm, $\|\cdot\|_1$ is the elementwise $L_1$ norm, columns of $H \in \mathbb{R}^{d \times r}$ are the non-negative components, $W \in \mathbb{R}^{r \times m}$ is the non-negative coefficient matrix, r is the rank of matrix H, which corresponds to the number of extracted components, and $\lambda$ and $\gamma$ are regularization parameters. A coordinate descent solver is used to find H and W.

After extracting the non-negative components, columns of H, and upsampling (i.e., resizing to the original image size to counter the effect of pooling layers) each component, the system processes each component by a Laplacian-of-Gaussian blob-detector to extract regions of the input spectrogram 302 that are considered salient by the CNN 300 (see Literature Reference No. 3 for further details regarding a Laplacian-of-Gaussian blob-detector). Each component is an image and corresponds to a column of H before upsampling. Here, the salient regions are time intervals designated as salient patches 322 that are cut from an audio signal (e.g., capturing a bird song in a playground scene).

Figure 4:
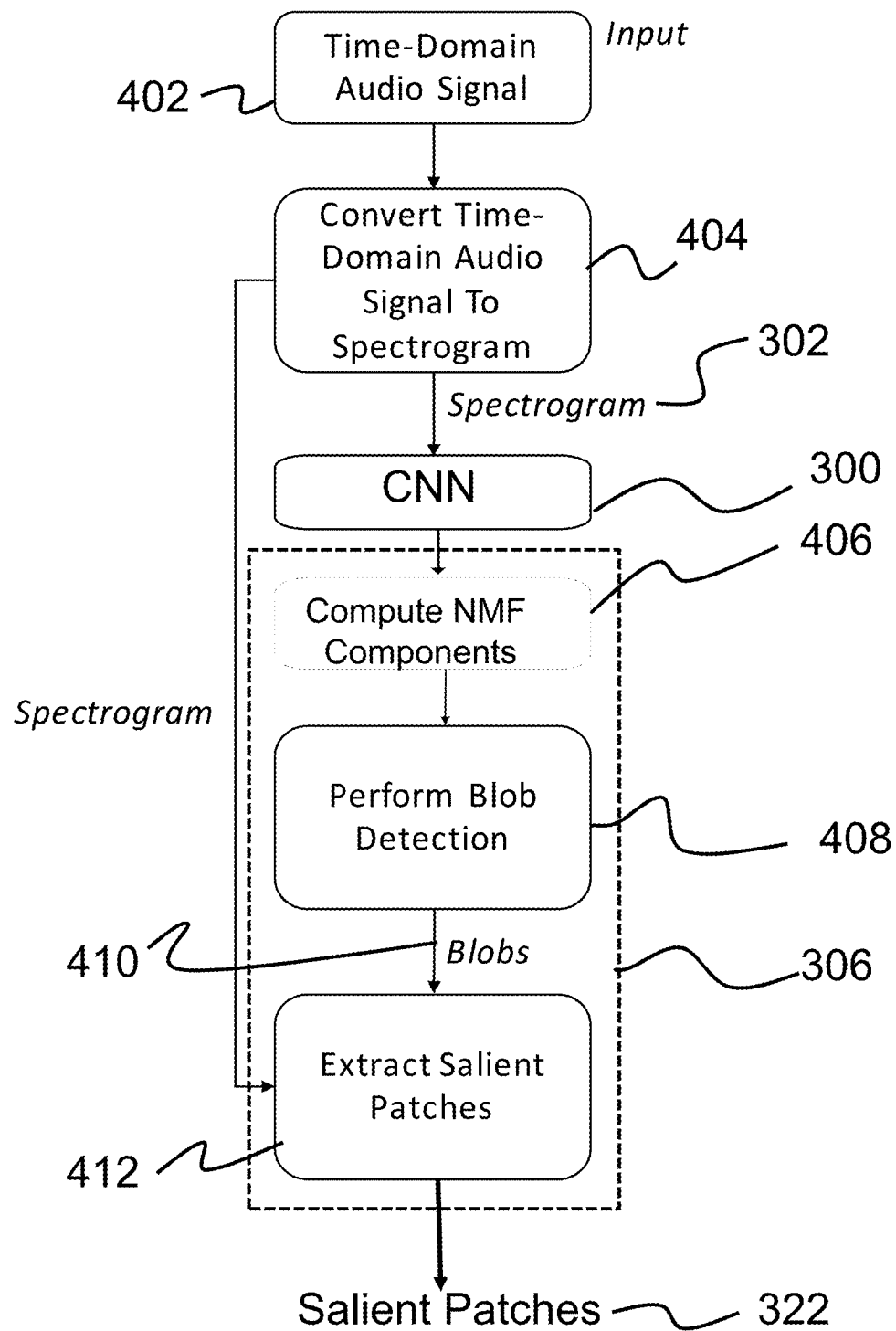
FIG. 4 is a flow chart illustrating a process according to various embodiments of the present invention where salient patches are extracted from an input.

FIG. 4 further illustrates the Salient Attribute Extraction 306 process. In relationship to FIG. 3, the process in FIG. 4 illustrates the flow from the audio spectrogram 302 through the deep CNN 300 and into the Salient Attribute Extraction box 306. The CNN 300 is used to learn the NMF components.

It should be noted that the input to the system is either a time-domain audio signal 402 or a spectrogram 302 after having been converted from the audio signal 402. If an audio signal 402, the signal 402 is converted 404 to the spectrogram 302 using any suitable conversion technique or system as understood by those skilled in the art, a non-limiting example of which includes the Short-Time Fourier Transform. The spectrogram 302 is passed to the pre-trained CNN 300, where the non-negative matric factorization (NMF) components are computed 406 from the last convolutional layer of the CNN 300. Referring again to FIG. 4, blob detection 408 is then performed on each NMF component to generate a collection of blobs 410 using a blob detector (e.g., Laplacian-of-Gaussian blob-detector as described by Lindeberg, see Literature Reference No. 3). The blobs 410 are used to extract 412 salient patches 322 from the spectrogram 302. The system extracts 412 the salient patches 322 using the blobs 410 by putting a tight bounding box around the blobs, which is then used as a boundary to cut out the patches from the spectrogram 302.

(4.2) GAP-Features Extraction

Figure 5:
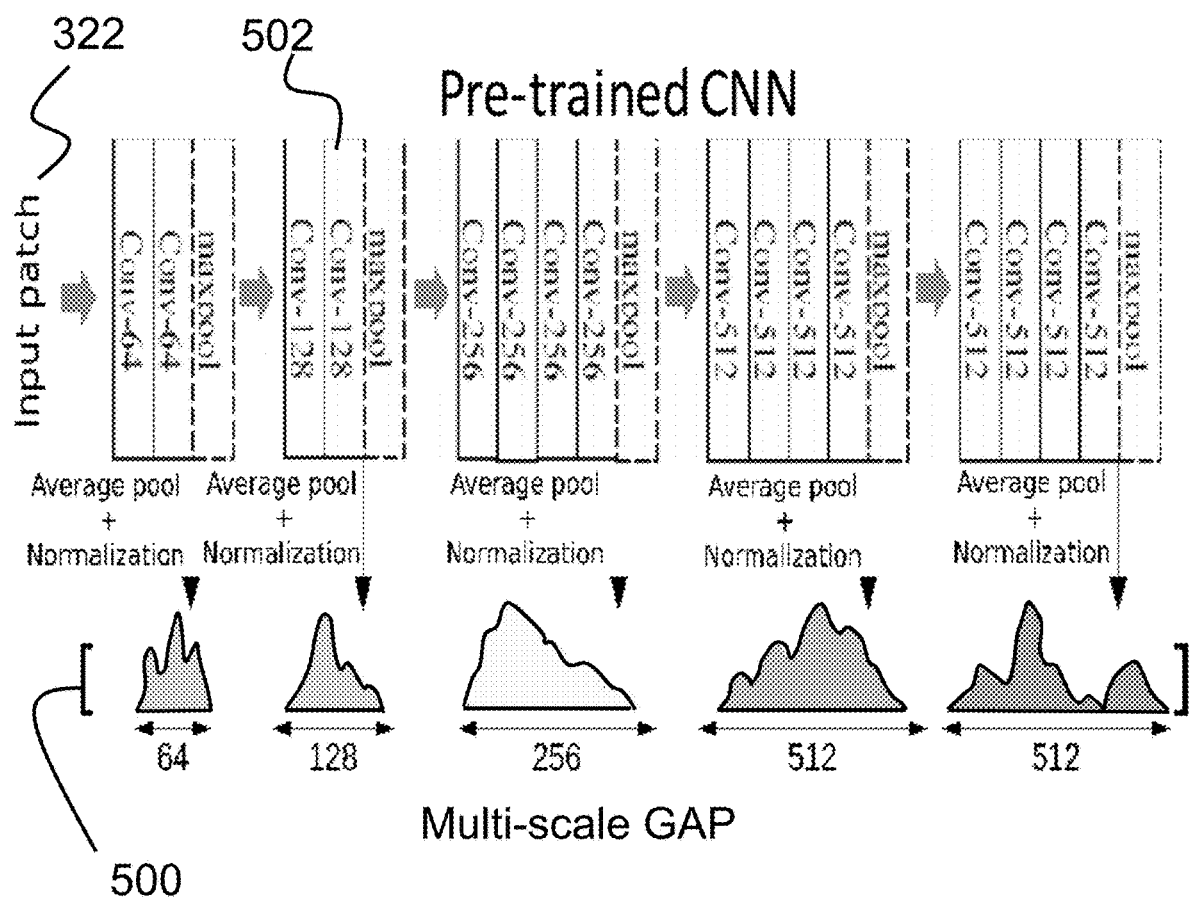
FIG. 5 is an illustration depicting extraction of multi-scale global average pooling (GAP) features from spectrogram patches according to various embodiments of the present invention.

In phase 2, the system probes the activation patterns of the CNN 300 at different layers and constructs a multi-scale feature for the extracted patches. As shown in FIG. 5, the system extracts multi-scale GAP features 500 from an input spectrogram salient patch 322 using a pre-trained CNN. This is done by performing general average pooling (GAP) at each layer of the network right before the 'max pooling' together with a normalization and concatenating the outputs.

The feature captures the response energy of various convolutional kernels 502 at different layers, and provides a succinct representation of the CNN. The normalization is needed so the scale of average pooling at different layers is the same (i.e. range is zero to one).

(4.3) Unsupervised Clustering of Salient Attributes

In the third phase, having the salient patches 322 from all spectrograms in the dataset and their corresponding GAP features 500, the system utilizes an unsupervised learning framework to identify the key attributes recognized by the network. As shown in FIG. 3, the system utilizes iterative unsupervised deep embedding for clustering (DEC) 316 as described by Xie et al. (see Literature Reference No. 5) to cluster the salient extracted patches 322 as key attribute clusters. The clustering is done on the GAP features, where each feature corresponds to a salient patch 322. The idea behind DEC is to transform the data into a linear/nonlinear embedding space with richer data representation and cluster the data in that space.

(4.4) Bag of Key-Attributes Extraction

In the training phase, the outcome of the unsupervised deep embedding method is a mapping, $f_\alpha$, that embeds the input GAP features into a discriminant subspace, together with the key-attributes, $\mu_j$ for $j=1, \ldots, k$. For a given input spectrogram, the system identifies the salient regions of the spectrogram, extracts GAP features from the M identified salient regions, $v_i$ for $i=1, M$ (M could vary for different input spectrograms), maps the features to the embedding via $f_\alpha$, and obtains their cluster memberships. Using the cluster memberships, the system generates the histogram of key attributes presented in a spectrogram, which encodes the normalized frequency of key-attribute occurrences. This histogram counts the occurrences of key attributes in an audio recording. For instance, the bag of key attributes (BoKA) feature for a playground scene would encode existence and frequency of corresponding key sound attributes like, e.g., laughing and bird song.

In the test phase, for a given input spectrogram, its BoKA feature is calculated using the process above (computation of salient region extraction, GAP features, and BoKA feature), but without relearning the unsupervised clustering. For classification, the resulting histogram is concatenated to the output of the CNN right before a Softmax classifier. In this manner, the network's extracted feature is enriched with an emphasis on the key learned attributes.

The Softmax layer of the CNN needs to be retrained to account for the BoKA feature. This retraining happens after computing the BoKA features of all training patterns and uses either the same training patterns or a subset for which classification labels are available.

Figure 6:
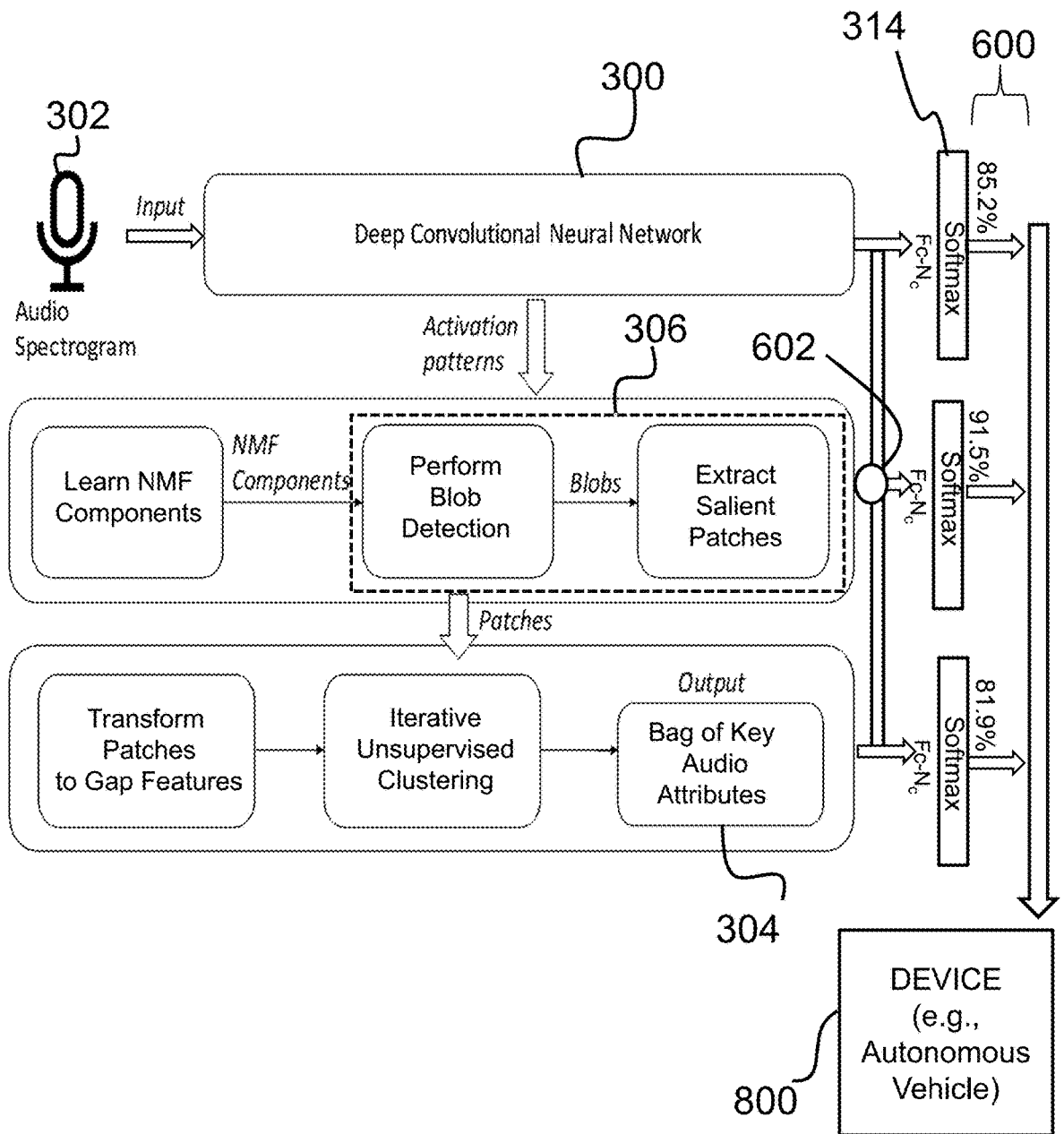
FIG. 6 is an illustration system architecture according to various embodiments of the present invention.

The system schematic is shown in FIG. 6. As shown, a test input spectrogram 302 goes through the system, and the final classification probability 600 is obtained based on the concatenated 602 features obtained from the deep CNN 300, the salient patch extraction process 306, and Bag of Key-Attributes 304 extraction. Supplementing a pre-trained CNN with a histogram of the key attributes reduces the error on a sound classification task without requiring any additional data. The features are concatenated 602 by simply concatenating the vectors, which allows them to be classified using any suitable classifier 314 (e.g., Softmax classifier). For example, concatenating [1,0,3] and [4,5,6] becomes [1,0,3, 4,5,6]. The classification provides a probability that the audio signal is a particular class. If the classification exceeds a predetermined threshold (e.g., 90%, etc. or any other predetermined number), then the audio signal is classified as the particular object class. A device 800 can then be caused to operate based on the classification.

(4.5) Control of a Device

Figure 8:
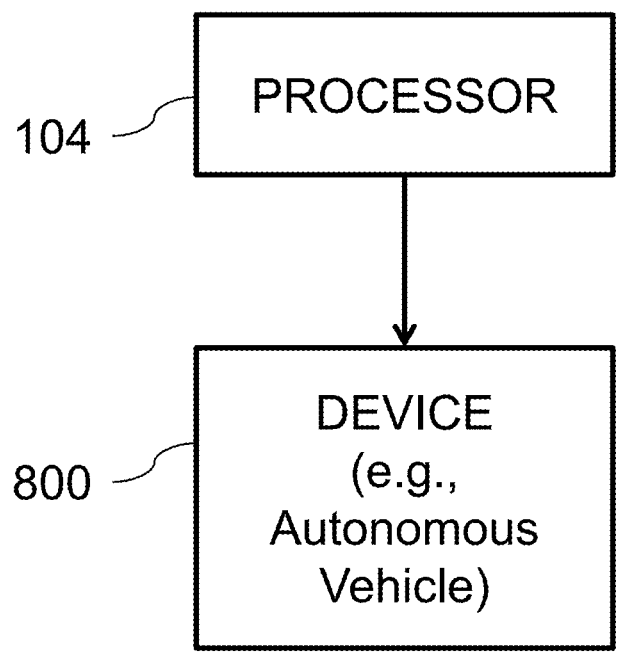
FIG. 8 is a block diagram depicting control of a device according to various embodiments.

As can be understood by those skilled in the art, there are a variety of applications in which such a robust and fool-proof audio classification system can be implemented, such as autonomous driving and rotorcraft operation. As shown in FIG. 8, a processor 104 implementing the audio classification process may be used to control a device 800 (e.g., a mobile device display, a virtual reality display, an augmented reality display, a computer monitor, a motor, a machine, a drone, a camera, an autonomous vehicle, etc.) based on discriminating (i.e., classifying) the object. Thus, the device 800 may be controlled to cause the device to move or otherwise initiate a physical action based on the discrimination or classification of the object(s) generating the audio signals.

In some embodiments, a drone or other autonomous vehicle may be controlled to move based on the classification. For example, if implemented in an autonomous vehicle, the vehicle may be caused to maneuver based on a particular classification, non-limiting examples of which include driving away from "explosive" sounds, or applying brakes to slow down when a classification such as "children playing" is detected. In yet some other embodiments, a camera may be controlled to orient towards the classification. In other words, actuators or motors are activated to cause the camera (or sensor) to move or zoom in on the location where sought after object is detected, such as "people talking".

For surveillance, the audio classification system may trigger an alarm, which could either be an audible sound or initiate a computer program to execute further actions (e.g., turning on/off lights, gas (via electrically controlling gas valves), or electricity, etc.). Thus and as can be appreciated, there are a number of devices that can be controlled based on classification of the object(s) generating the audio signals.

(4.6) Reduction to Practice.

A key component of the system was tested to verify the classification superiority of the system as compared to the prior art. Specifically, key-attribute extraction was tested on an audio data set. The training set contained 8732 sound excerpts (<=4 s) distributed in 10 classes (e.g., UrbanSound8K—see Literature Reference No. 4). The audio samples were converted into spectrograms. First, a deep network learned the mapping from the spectrograms onto the class labels. A 10-layer network was used: two convolutional layers with 32 features followed by max pooling, two more layers with 64 features followed by max pooling, four more layers with 128 features followed by max pooling, and, finally, two fully connected layers mapping onto a Softmax classifier. On the input spectrogram, the kernel size was 60×3 with a stride length of 1, where 60 was the number of spectrogram frequencies and 3 the number of time steps of the kernel window. After each convolutional layer, Exponential Linear Units (ELU) was used as nonlinearity.

Figure 7:
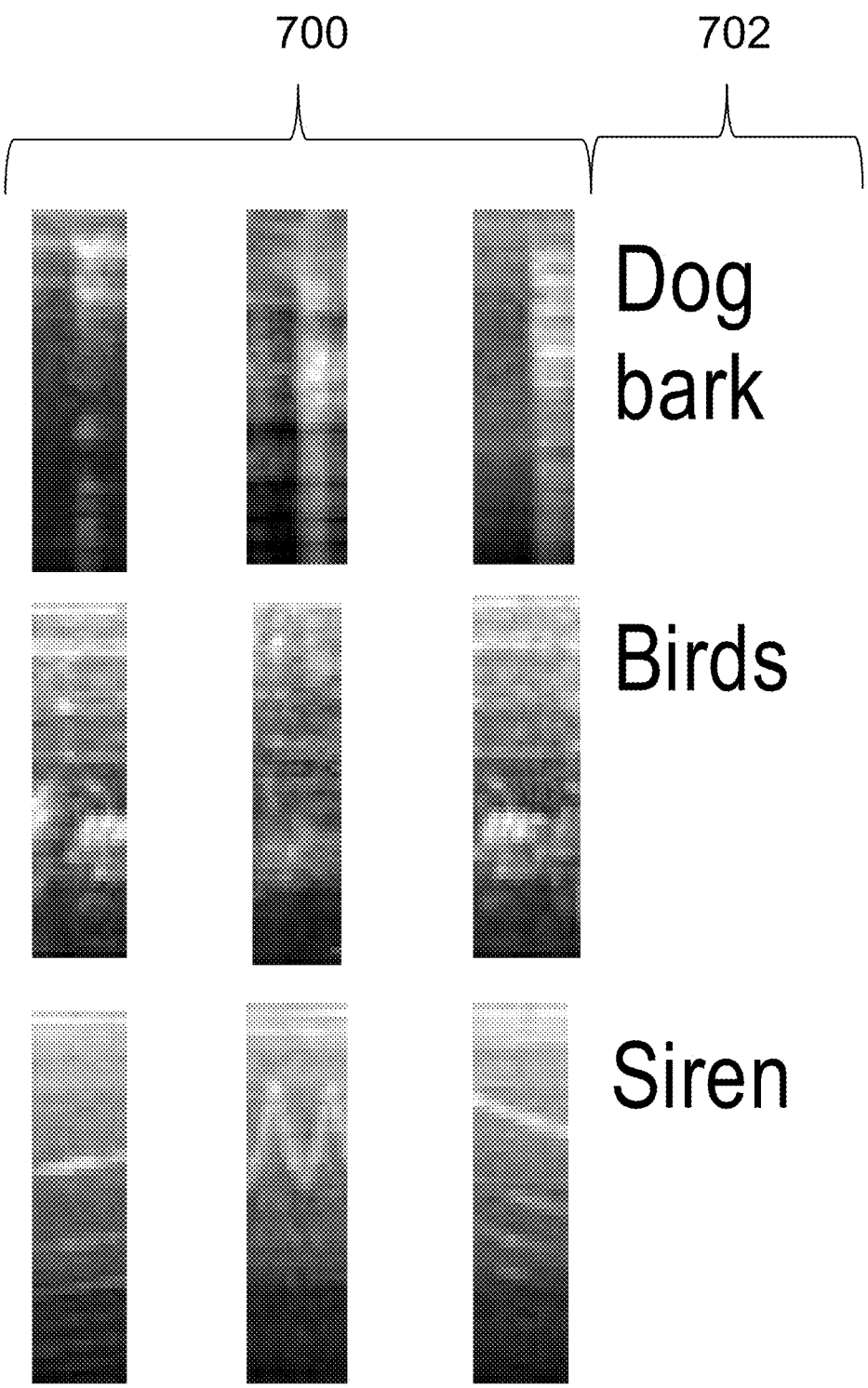
FIG. 7 is an illustration depicting samples of sound attribute groups and corresponding classifications.

As in Phase 1 above, the deep CNN was first used to extract salient patches. In total, 19,048 spectrogram patches were extracted. Then, GAP features were extracted, and the patches were clustered in an unsupervised way into 20 clusters. The patches closest to a cluster center were evaluated. As a result and as shown in FIG. 7, example patches 700 were extracted from spectrograms that belong to sound classes 702 such as "birds", "dog bark", and "siren". The system identified a variety of salient sound attributes, including attributes that were not labeled in the data set, such "bird song". Furthermore, the system was able to isolate fine-grained sound attributes, e.g., police car siren versus ambulance siren.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. An audio classification system, the system comprising:
one or more processors and a memory, the memory being a non-transitory computer-readable medium having executable instructions encoded thereon, such that upon execution of the instructions, the one or more processors perform operations of:
generating a set of activation patterns of a pre-trained convolutional neural network (CNN) comprising a plurality of layers by passing an input spectrogram of an audio signal to the CNN;
applying non-negative matrix factorization (NMF) to the set of activation patterns;
extracting a plurality of salient regions of the input spectrogram corresponding to salient audio segments in the audio signal;
performing general average pooling (GAP) at each layer of the CNN;
extracting a plurality of GAP features, where each GAP feature corresponds to a salient region of the input spectrogram of the audio signal;
clustering the plurality of GAP features;
generating a histogram of occurrences of key attributes in the audio signal;
concatenating the histogram of occurrences of key attributes in the audio signal to extracted CNN features, whereby the extracted CNN features are enriched with an emphasis on the key attributes in the audio signal;
mapping the concatenation of the histogram and extracted CNN features onto classification probabilities using a classifier;
classifying the audio signal as an object class based on the classification probabilities; and
causing a device to perform based on the classification of the audio signal.

2. The system as set forth in claim 1, wherein the salient regions are extracted based on the CNN's activation for each spectrogram pixel or group of pixels in the input spectrogram.

3. The system as set forth in claim 1, wherein in clustering the plurality of GAP features, the GAP features are clustered using iterative unsupervised deep embedding for clustering.

4. The system as set forth in claim 3, wherein the device is an autonomous vehicle, such that autonomous vehicle performs a physical maneuver operation based on the classification of the audio signal.

5. The system as set forth in claim 1, wherein the device is an autonomous vehicle, such that autonomous vehicle performs a physical maneuver operation based on the classification of the audio signal.

6. A computer program product for audio classification, the computer program product comprising:
a non-transitory computer-readable medium having executable instructions encoded thereon, such that upon execution of the instructions by one or more processors, the one or more processors perform operations of:
generating a set of activation patterns of a pre-trained convolutional neural network (CNN) comprising a plurality of layers by passing an input spectrogram of an audio signal to the CNN;
applying non-negative matrix factorization (NMF) to the set of activation patterns;
extracting a plurality of salient regions of the input spectrogram corresponding to salient audio segments in the audio signal;
performing general average pooling (GAP) at each layer of the CNN;
extracting a plurality of GAP features, where each GAP feature corresponds to a salient region of the input spectrogram of the audio signal;
clustering the plurality of GAP features;
generating a histogram of occurrences of key attributes in the audio signal;
concatenating the histogram of occurrences of key attributes in the audio signal to extracted CNN features, whereby the extracted CNN features are enriched with an emphasis on the key attributes in the audio signal;
mapping the concatenation of the histogram and extracted CNN features onto classification probabilities using a classifier;
classifying the audio signal as an object class based on the classification probabilities; and
causing a device to perform based on the classification of the audio signal.

7. The computer program product as set forth in claim 6, wherein the salient regions are extracted based on the CNN's activation for each spectrogram pixel or group of pixels in the input spectrogram.

8. The computer program product as set forth in claim 6, wherein in clustering the plurality of GAP features, the GAP features are clustered using iterative unsupervised deep embedding for clustering.

9. The computer program product as set forth in claim 8, wherein the device is an autonomous vehicle, such that autonomous vehicle performs a physical maneuver operation based on the classification of the audio signal.

10. The computer program product as set forth in claim 6, wherein the device is an autonomous vehicle, such that autonomous vehicle performs a physical maneuver operation based on the classification of the audio signal.

11. A computer implemented method for audio classification, the method comprising an act of:
causing one or more processers to execute instructions encoded on a non-transitory computer-readable medium, such that upon execution, the one or more processors perform operations of:

generating a set of activation patterns of a pre-trained convolutional neural network (CNN) comprising a plurality of layers by passing an input spectrogram of an audio signal to the CNN;

applying non-negative matrix factorization (NMF) to the set of activation patterns;

extracting a plurality of salient regions of the input spectrogram corresponding to salient audio segments in the audio signal;

performing general average pooling (GAP) at each layer of the CNN;

extracting a plurality of GAP features, where each GAP feature corresponds to a salient region of the input spectrogram of the audio signal;

clustering the plurality of GAP features;

generating a histogram of occurrences of key attributes in the audio signal;

concatenating the histogram of occurrences of key attributes in the audio signal to extracted CNN features, whereby the extracted CNN features are enriched with an emphasis on the key attributes in the audio signal;

mapping the concatenation of the histogram and extracted CNN features onto classification probabilities using a classifier;

classifying the audio signal as an object class based on the classification probabilities; and causing a device to perform based on the classification of the audio signal.

12. The method as set forth in claim 11, wherein the salient regions are extracted based on the CNN's activation for each spectrogram pixel or group of pixels in the input spectrogram.

13. The method as set forth in claim 11, wherein in clustering the plurality of GAP features, the GAP features are clustered using iterative unsupervised deep embedding for clustering.

14. The method as set forth in claim 13, wherein the device is an autonomous vehicle, such that autonomous vehicle performs a physical maneuver operation based on the classification of the audio signal.

15. The method as set forth in claim 11, wherein the device is an autonomous vehicle, such that autonomous vehicle performs a physical maneuver operation based on the classification of the audio signal.

* * * * *